(12) United States Patent
Viotto et al.

(10) Patent No.: US 11,888,439 B2
(45) Date of Patent: Jan. 30, 2024

(54) METHOD FOR DETERMINING A CHARACTERISTIC CURVE OF A PHOTOVOLTAIC (PV) STRING, DC/DC CONVERTER, AND PHOTOVOLTAIC SYSTEM SUITABLE FOR CARRYING OUT THE METHOD

(71) Applicant: SMA Solar Technology AG, Niestetal (DE)

(72) Inventors: Michael Viotto, Kassel (DE); Markus Hopf, Espenau (DE); Bernhard Schropp, Kassel (DE)

(73) Assignee: SMA Solar Technology AG, Niestetal (DE)

( * ) Notice: Subject to any disclaimer, the term of this patent is extended or adjusted under 35 U.S.C. 154(b) by 42 days.

(21) Appl. No.: 17/553,865

(22) Filed: Dec. 17, 2021

(65) Prior Publication Data

US 2022/0109401 A1 Apr. 7, 2022

Related U.S. Application Data

(63) Continuation of application No. PCT/EP2020/062424, filed on May 5, 2020.

(30) Foreign Application Priority Data

Jun. 18, 2019 (DE) .................... 10 2019 116 548.2

(51) Int. Cl.
*H02S 40/32* (2014.01)
*H02S 40/36* (2014.01)
*H02M 3/139* (2006.01)

(52) U.S. Cl.
CPC ............. *H02S 40/32* (2014.12); *H02M 3/139* (2013.01); *H02S 40/36* (2014.12)

(58) Field of Classification Search
CPC ......... H02S 40/32; H02S 40/36; H02M 3/139
See application file for complete search history.

(56) References Cited

U.S. PATENT DOCUMENTS

2009/0140715 A1 6/2009 Adest
2011/0160930 A1* 6/2011 Batten .................. G05F 1/67
700/297

(Continued)

FOREIGN PATENT DOCUMENTS

DE 102013112988 A1 5/2015

OTHER PUBLICATIONS

Intenrational Search Report dated Jul. 15, 2020 in connectio nwith PCT/EP2020/062424.

*Primary Examiner* — Jared Fureman
*Assistant Examiner* — Duc M Pham
(74) *Attorney, Agent, or Firm* — Eschweiler & Potashnik, LLC (57) ABSTRACT

The disclosure relates to a method for determining a characteristic curve for a photovoltaic (PV) string of a photovoltaic system having an inverter which is connected to the photovoltaic string and to a power supply network. The photovoltaic string includes a series connection of a plurality of photovoltaic modules, in which series connection at least one of the photovoltaic modules is integrated into the series connection of the photovoltaic modules via a DC/DC converter. The at least one DC/DC converter operates the photovoltaic module assigned thereto in a first operating mode M1 at a maximum power point by varying, over time, a conversion ratio of output voltage ($U_{Out}$) to input voltage ($U_{In}$), and operates the photovoltaic module in a second operating mode M2 with a conversion ratio of output voltage ($U_{Out}$) to input voltage ($U_{In}$) that is constant over time. The method includes operating the at least one DC/DC converter in the second operating mode M2 in response to a current (Continued)

signature for the current ($I_{Str}$) through the photovoltaic string, determining the characteristic curve by varying the current $I_{Str}$ or the voltage $U_{Str}$ of the photovoltaic string by the inverter, and detecting values assigned to one another for current $I_{Str}$ and voltage $U_{Str}$ of the photovoltaic string in the second operating mode M2 of the DC/DC converter.

16 Claims, 3 Drawing Sheets

(56) References Cited

U.S. PATENT DOCUMENTS

2016/0241078 A1\* 8/2016 Miyoshi ............ H02J 7/00
2016/0254673 A1   9/2016 Batten
2018/0159466 A1\* 6/2018 Ringer ............ G01R 31/40

\* cited by examiner

METHOD FOR DETERMINING A CHARACTERISTIC CURVE OF A PHOTOVOLTAIC (PV) STRING, DC/DC CONVERTER, AND PHOTOVOLTAIC SYSTEM SUITABLE FOR CARRYING OUT THE METHOD

CROSS REFERENCE TO RELATED APPLICATIONS

This application is a continuation of International Patent Application number PCT/EP2020/062424, filed on May 5, 2020, which claims priority to German Patent Application number 10 2019 116 548.2, filed on Jun. 18, 2019, and is hereby incorporated by reference in its entirety.

FIELD

The disclosure relates to a method for determining a characteristic curve of a photovoltaic (PV) string, in particular of a PV string having at least one DC/DC converter. The disclosure furthermore relates to a DC/DC converter and to a PV system that is suitable for carrying out the method.

BACKGROUND

As a PV generator, a photovoltaic (PV) system typically comprises one or more PV strings, each containing a series connection of several PV modules. If any of the PV modules of a PV string are shaded, this leads to a loss of yield. This yield loss is not only limited to a reduced performance of the shaded PV modules but also additionally leads to a loss of yield for the non-shaded PV modules within the PV string.

In order to limit the loss of yield of the entire PV string to a portion of the PV modules in the event of a shading, integrating individual, and possibly also all, PV modules of the PV string into the series connection of the PV modules via a DC/DC converter, a so-called power optimizer, in each case is known. A DC/DC converter operating as a power optimizer ensures, by means of its own MPP (MPP=maximum power point) tracking method, that the PV module connected on the input side to the DC/DC converter is always operated at a maximum power point, independently of the remaining PV modules of the series connection. In this way, the loss of yield of the PV string remains limited only to the shaded PV modules within the PV string.

However, with their MPP tracking method, the DC/DC converters assigned to the individual PV modules influence a characteristic curve (e.g., a current-voltage (IU) characteristic curve and/or a power-voltage (PU) characteristic curve) that can be detected at the terminals of the PV string. A measurable characteristic curve of a PV string, which has such DC/DC converters, thus differs from a real characteristic curve as it would be observable without DC/DC converters at the terminals of the otherwise identical PV string. Specifically, for example, the MPP tracking running in the DC/DC converters results in a plateau within a power-voltage (PU) characteristic curve of the PV string. However, errors in the PV string, e.g., a voltage-induced degradation of the PV modules, can often be detected from a determination of the real characteristic curve. Therefore, in certain circumstances, it may be desired to be able to detect the real characteristic curve of a PV string comprising one or more power optimizers.

It is known that, with a DC/DC converter that is operated at a constant conversion ratio, a current-voltage characteristic curve of a DC source connected to the DC/DC converter on the input side is transferred to an output of the DC/DC converter. In this case, a scaling of the characteristic curve of the DC source transferred to the output relative to the characteristic curve of the DC source present on the input side depends upon the respective conversion ratio of output voltage $U_{Out}$ to input voltage $U_{In}$ of the DC/DC converter.

Document WO 2011 082184 A2 discloses a PV system with several local DC/DC converters, each assigned to a PV module, and a central DC/AC converter. The local DC/DC converters can be operated in a first operating mode with an MPP tracking method running in the DC/DC converters. Alternatively, in a second operating mode, the DC/DC converters can be operated with a constant conversion ratio of input voltage to output voltage. Before switching from the first to the second operating mode, a value, assigned to the MPP operating point, for a duty cycle and a further electrical parameter assigned to the MPP operating point are stored within the DC/DC converter. While the DC/DC converter is now operated in the second operating mode, the further electrical parameter is detected continuously. Switching from the second operating mode to the first operating mode takes place if a difference between the detected value and the stored value for the further electrical parameter in the PV string exceeds a threshold value. With the known method, switching from the first operating mode to the second operating mode of the DC/DC converter takes place at regular time intervals.

SUMMARY

The disclosure is directed to a method for determining a characteristic curve of a photovoltaic (PV) string having at least one DC/DC converter operating as a power optimizer. The characteristic curve is to reflect the characteristic curve that is present on an otherwise identical PV string that is, however, free of DC/DC converters operating as power optimizers. The method is to make it possible to determine the characteristic curve, in particular also as needed, for example at times that are different from a regularly recurring time interval. The method is to be carried out in one embodiment as simply and cost-effectively as possible and using a central measurement unit. It is also an aim of the disclosure to demonstrate a DC/DC converter that is suitable for the method and a PV system that is suitable for carrying out the method.

A method according to the disclosure serves to determine a characteristic curve for a photovoltaic (PV) string of a PV system having an inverter, which is connected on an input side thereof to the PV string and on an output side thereof to a power supply network (PSN). The PV string comprises a series connection of multiple PV modules, in which at least one of the PV modules is integrated into the series connection of the PV modules via a DC/DC converter. The at least one DC/DC converter is configured to operate the PV module assigned or connected thereto in a first operating mode M1 by a temporal variation of a conversion ratio of output voltage $U_{Out}$ to input voltage $U_{In}$ of the DC/DC converter at a maximum power point, and to operate the PV module assigned or connected thereto in a second operating mode M2 with a temporally constant conversion ratio of output voltage ($U_{Out}$) to input voltage ($U_{In}$) of the DC/DC converter. The method comprises operating the at least one DC/DC converter in the second operating mode M2 in response to a current signature for the current $I_{Str}$ through the PV string, wherein the current signature is produced by the inverter, and determining the characteristic curve by variation of the current $I_{Str}$ or the voltage $U_{Str}$ of the PV string by the inverter and detecting values assigned to one another for current $I_{Str}$ and voltage $U_{Str}$ of the PV string in the second operating mode M2 of the DC/DC converter.

In principle, the current signature can be any time characteristic, previously known to the DC/DC converter, as a signal, for the current $I_{Str}$ through the PV string. The current signature is impressed on the PV string by the inverter. The impressing can take place, for example, by an inductive or capacitive coupling unit already present in the inverter. Coupling units of this type are used, for example, to generate a "keep-alive signal" in the PV string. However, the current signature may also be impressed on the string by an operating mode of the inverter. As a result of suitable means for measuring current at its output, the DC/DC converter is configured to detect the current signature. Such means for measuring current are present in any case in conventional DC/DC converters and therefore do not constitute additional effort. The detected current signature is interpreted by the DC/DC converter as a signal to assume the second operating mode M2 with a constant conversion ratio of output voltage $U_{Out}$ to input voltage $U_{In}$ and to maintain it at least for a certain time period. In this case, the DC/DC converter can previously be operated in the first operating mode M1, in which MPP tracking of the PV module connected on the input side takes place. Alternatively, however, it is also possible for the DC/DC converter to previously be present in a deactivated state, in which a power draw from the PV module connected on the input side is suppressed, and activation of the DC/DC converter starts directly with operation in the second operating mode M2. A characteristic curve of the PV module connected on the input side can be measured at the output of the DC/DC converter in the second operating mode M2, while, in the first operating mode M1 of the DC/DC converter, it is modified by the temporal variation of the conversion ratio within the framework of the MPP tracking such that the characteristic curve detectable at the output is unsuitable for further evaluation. During the second operating mode M2 of the DC/DC converter, variation of current $I_{Str}$ or voltage $U_{Str}$ within the PV string now takes place by means of the inverter. For example, the voltage $U_{Str}$ of the PV string is changed from a minimum value to the no-load voltage of the PV string. Upon this change, values assigned to one another of current $I_{Str}$ and voltage $U_{Str}$ are detected by a measurement unit connected to the PV string. In this way, the characteristic curve can be determined as it is present on the PV string that is otherwise identical but does not have a DC/DC converter. The characteristic curve to be determined can, for example, be a current-voltage (IU) characteristic curve or a power-voltage (PU) characteristic curve of the PV string.

If the PV string has several DC/DC converters, in one embodiment all DC/DC converters of the corresponding PV string can assume their second operating mode M2 after detecting the current signature for the current $I_{Str}$ in the PV string. The current signature can be generated by the inverter as needed. The effort required for this purpose is essentially limited to adaptation of operating software of the inverter. Additional components are not necessary, or are necessary at least only to a manageable extent. A measurement unit for determining the current values $I_{Str}$ and voltage values $U_{Str}$ is also often present in any case within the inverter. The DC/DC converters do not require a communications unit, in particular a separate communications unit, configured as a transmitting device. In summary, this results in a simple and cost-effective method for determining a characteristic curve for a PV string which is designed with DC/DC converters operating as power optimizers.

In one embodiment of the method, the current signature comprises the current $I_{Str}$ in the PV string falling below a limit value $I_{LV}$. The current $I_{Str}$ can in one embodiment fall below the limit value $I_{LV}$ for a first time period $\Delta t_1$. For example, the inverter can operate the PV string near its no-load voltage for the first time period $\Delta t_1$ and can thereby produce a current $I_{Str}$ through the PV string below the limit value $I_{Str}<I_{LV}$. This prevents an incorrect interpretation of otherwise occurring current fluctuations within the PV string, as can occur, for example, due to weather.

In one embodiment of the method, the at least one DC/DC converter can be operated in the second operating mode M2 for a predefined second time period $\Delta t_2$. The second time period $\Delta t_2$ is selected such that a complete traversal of the characteristic curve of the PV string is made possible. After the second time period $\Delta t_2$ has elapsed, the at least one DC/DC converter can automatically exit the second operating mode M2. After the second time period $\Delta t_2$ has elapsed, the at least one DC/DC converter can be operated in the first operating mode M1 with an MPP tracking method for the PV module assigned thereto running within the DC/DC converter. Alternatively, it can also be operated, at least temporarily, in a third operating mode M3, in which a power draw of the PV module assigned to the DC/DC converter is suppressed.

With a further embodiment of the method, all of the multiple PV modules of the PV string are each integrated into the series connection of the PV modules via a DC/DC converter. In this case, all DC/DC converters within the corresponding PV string may be operated in the second operating mode M2 with the same temporally constant conversion ratio of output voltage $U_{Out}$ to input voltage $U_{In}$. In one embodiment, all the DC/DC converters within the PV string are operated with the temporally constant conversion ratio of the value "1" during the second operating mode M2. This facilitates the evaluation of the characteristic curve, in particular with respect to subsequent rescaling.

In a further embodiment, individual identifiers may be assigned to the individual DC/DC converters. The current signature can comprise the identifiers of those DC/DC converters that are to be set to operate in the second operating mode M2 or that are to be set to oprate in the third operating mode M3. In particular, a portion of the DC/DC converters can then be operated in the operating mode M2 with a fixed conversion ratio, while another portion of the DC/DC converters can be operated in the third operating mode M3, in which the power output by the PV modules is suppressed. In this way, a characteristic curve that relates only to the PV modules whose assigned DC/DC converters are operated in the second operating mode M2 can then be recorded by the measuring device. Where appropriate, the characteristic curve can also include those PV modules of the PV string that are not integrated into the series connection of the PV modules via a DC/DC converter. In contrast, those PV modules whose DC/DC converters are in the third operating mode M3 do not contribute to the characteristic curve measurement. Rather, a power draw of those PV modules whose assigned DC/DC converter is in the third operating mode M3 is suppressed. In this way, the targeted analysis of only a portion of the PV string is possible.

In principle, it is within the scope of the disclosure that the detection of the values for current $I_{Str}$ and voltage $U_{Str}$ take place by means of a separate, advantageously mobile, measurement unit, which can be connected to the PV string only as needed for detection. In one embodiment of the method, the values assigned to one another for current $I_{Str}$ and voltage $U_{Str}$ for determining the characteristic curve can be detected by a measurement unit arranged within the inverter. In this way, measurement units that are present in any case in the inverter can, expediently, be used for the method. In a further embodiment of the method, the conversion ratio of output voltage $U_{Out}$ to input voltage $U_{In}$ in the second operating mode M2 for the at least one DC/DC converter, possibly for all DC/DC converters, within the PV string can be selected in such a way that a voltage $U_{Str}$ of the PV string is within a permitted range for an input voltage of the inverter. By selecting the corresponding conversion ratio, the detectable range of the characteristic curve can be influenced. This is particularly advantageous if the measurement unit is arranged within the inverter, and a permitted range for an input voltage of the inverter should not be left when the characteristic curve is traversed.

In one embodiment of the method, the current signature is generated by the inverter in an event-controlled or demand-controlled manner. An event can, for example, include a check of the PV string by an installer. In this case, the installer can cause the inverter to generate the current signature directly if necessary. For this purpose, control software of the inverter can have a corresponding menu item. However, an event may also be an error within the PV system transmitted to the inverter or detected by the inverter. Alternatively, it is possible for the inverter to generate the current signature in a time-controlled manner, and not in an event-controlled manner. An electronic clock present in any case in the inverter can be used for this purpose.

A DC/DC converter that is suitable for carrying out the method according to the disclosure comprises an input for connecting a PV module and an output for connecting the DC/DC converter to further PV modules of a series connection of PV modules of a PV string. The DC/DC converter is configured, in a first operating mode M1, to operate the PV module connected on the input side thereof and assigned thereto at a maximum power point by a temporal variation of a conversion ratio of output voltage $U_{Out}$ to input voltage $U_{In}$ of the DC/DC converter, and, in a second operating mode M2, to operate the PV module assigned thereto with a temporally constant conversion ratio of output voltage $U_{Out}$ to input voltage $U_{In}$ of the DC/DC converter. The DC/DC converter is furthermore configured to assume the second operating mode M2 in response to a current signature that is contained in a current $I_{Str}$ flowing via the output of the DC/DC converter and is detected by the DC/DC converter. In this case, it is possible for the DC/DC converter to previously be operated in the first operating mode M1 and to switch from the first operating mode M1 to the second operating mode M2 in response to the current signature. Alternatively, however, it is also possible for the DC/DC converter to previously be present in a deactivated state and for the DC/DC converter to be activated directly with the assumption of the second operating mode M2. This gives rise to the advantages already mentioned in connection with the method for the DC/DC converter.

In principle, the DC/DC converter according to the disclosure can be configured as a boost converter, a buck converter, or as a combined buck-boost converter. In one embodiment, however, the DC/DC converter is configured as a buck converter.

A photovoltaic (PV) system according to the disclosure comprises a PV generator comprising at least one PV string having a series connection of multiple PV modules, and an inverter connected on an input side thereof to the PV string and on an output side thereof to a power supply network (PSN). The inverter is configured to produce a current signature in the PV string in response to a trigger signal, and to subsequently vary, in particular within a second time period $\Delta t_2$, a voltage $U_{Str}$ of the PV string in order to determine a characteristic curve of the PV string. The PV system furthermore comprises a measurement unit for detecting values assigned to one another for current $I_{Str}$ and voltage $U_{Str}$ of the PV string. The PV system according to the disclosure is characterized in that, in the at least one PV string, at least one of the PV modules is integrated into the series connection of the PV modules via a DC/DC converter according to the disclosure, and the PV system, in particular a control unit of the PV system, is designed and configured to carry out the method according to the disclosure. The advantages already mentioned in connection with the method also arise here.

In an advantageous embodiment of the PV system, a plurality, in particular all, of the multiple PV modules of the PV string or all PV modules of the PV generator are connected to the series connection of the PV modules via a DC/DC converter according to the disclosure. In a further embodiment of the PV system, the measurement unit can be arranged within the inverter. Alternatively, however, it is also possible for the measurement unit to be a separate, in particular mobile measurement unit, which is connected to the PV string of the PV system only during the detection of the current $I_{Str}$ and voltage values $U_{Str}$ assigned to one another. Advantageously, the measurement unit can comprise or can be connected to a communications unit for communicating the current values $I_{Str}$ and voltage values $U_{Str}$.

BRIEF DESCRIPTION OF THE FIGURES

The disclosure is shown below with reference to figures. These show.

DETAILED DESCRIPTION

Figure 1:
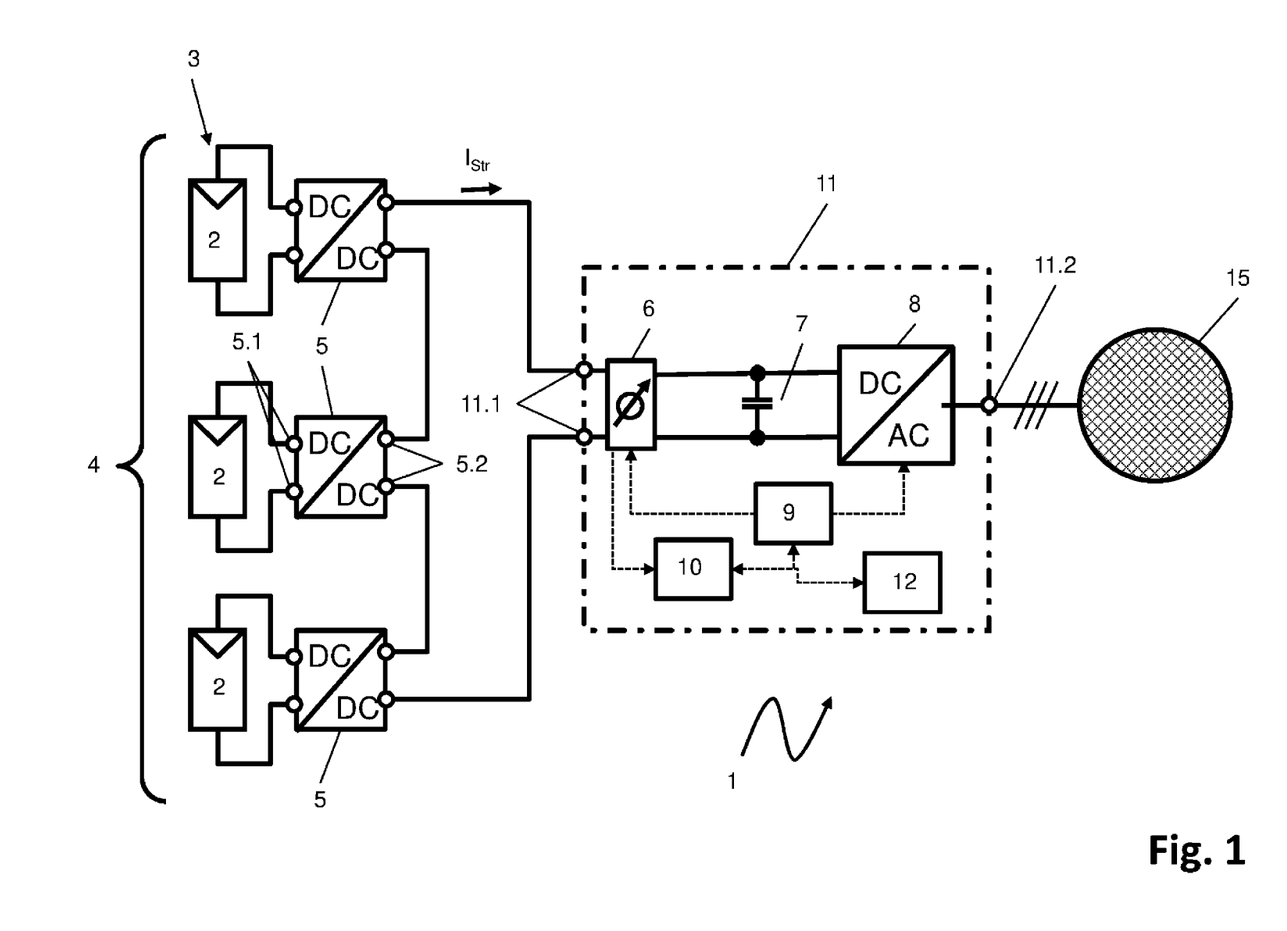
FIG. 1 a first embodiment of a PV system according to the disclosure.

FIG. 1 shows a first embodiment of a PV system 1 according to the disclosure. The PV system 1 comprises a PV generator 4, which is formed by a PV string 3. Within the PV string 3, several PV modules 2 (here: three by way of example) are connected to one another via a series connection. Each of the PV modules 2 is integrated into the series connection of the PV modules 2 via a DC/DC converter 5 according to the disclosure. For this purpose, each of the DC/DC converters 5 has an input 5.1 to which the PV module 2 assigned to the DC/DC converter 5 is connected, and an output 5.2. The PV string 3 is connected to an input 11.1 of an inverter 11. In a first operating mode M1, the DC/DC converters 5 are designed to operate, via temporal variation of the conversion ratio of output voltage $U_{Out}$ to input voltage $U_{In}$, the PV module 2 assigned thereto at its respective MPP operating point, independently of the further PV modules 2 of the PV string 3. In addition, in a second operating mode M2, they are designed to be operated with a temporally constant conversion ratio of output voltage $U_{Out}$ to input voltage $U_{In}$. They are furthermore configured to detect a current signature within a current $I_{Str}$ flowing via their output 5.2 and to adopt the second operating mode M2 in response thereto.

Figure 2:
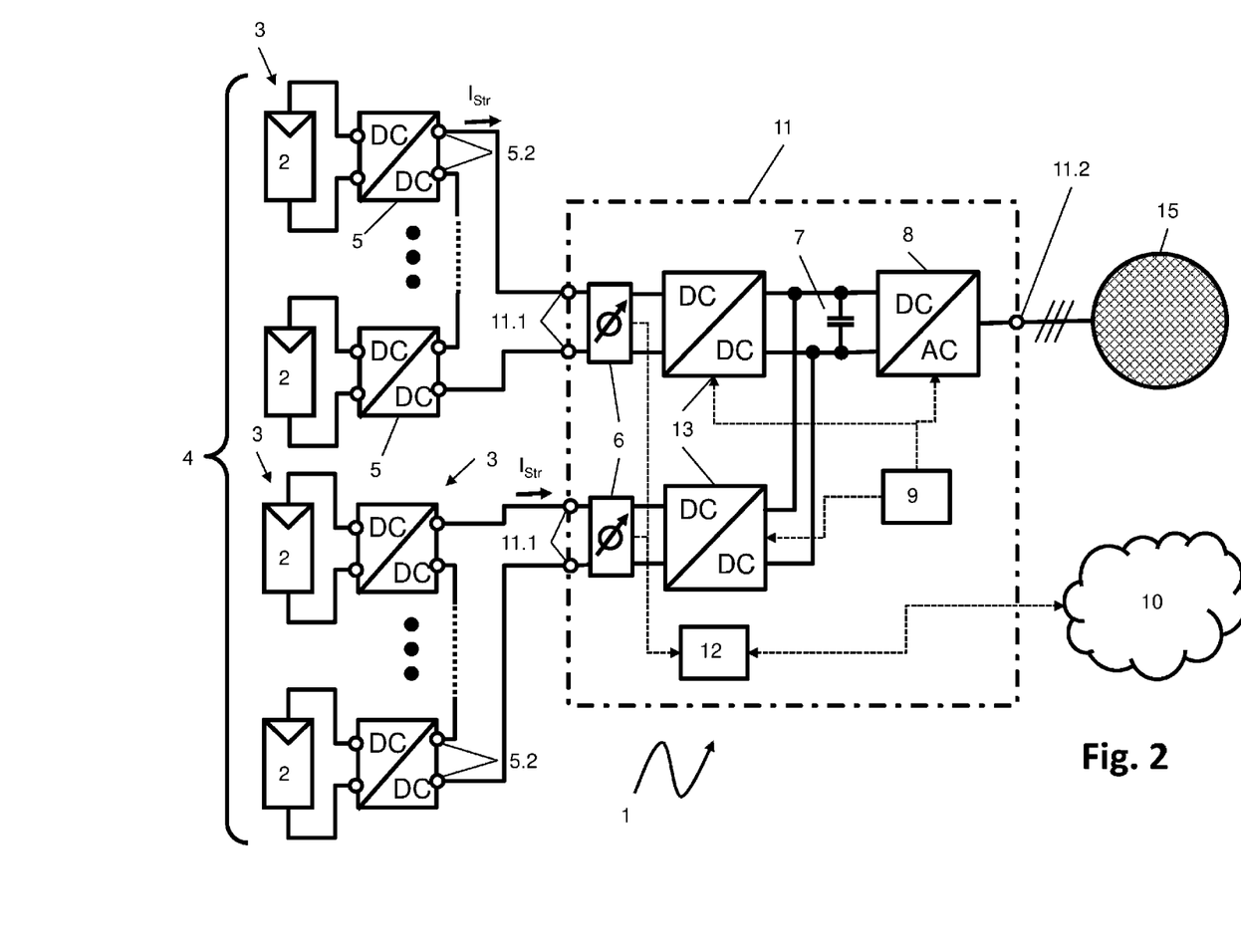
FIG. 2 a second embodiment of a PV system according to the disclosure.

In FIG. 1, the inverter 11 is formed as an example of a single-stage, three-phase inverter. Alternatively, however, it is also possible for the inverter 11 to have a different number of phases at its output 11.2 and/or to have a multi-stage form (see FIG. 2). The inverter 11 includes a DC/AC converter 8 having an input-side intermediate circuit 7, and a control unit 9 for controlling the DC/AC converter 8. The inverter 11 also includes a measurement unit 6 connected to the input 11.1, an evaluation unit 10, and a communications unit 12. For feeding in regeneratively generated energy, the output 11.2 of the inverter 11 is connected to a power supply network (PSN) 15. The measurement unit 6 is designed to detect several electrical parameters, e.g., a current $I_{Str}$ and a voltage $U_{Str}$ of the PV string 3, and to transmit the detected values to the evaluation unit 10. The evaluation unit 10 is configured to evaluate a characteristic curve, e.g., an IU characteristic curve or a PU characteristic curve, from the detected values. It is also able to store the characteristic curve and to compare a currently measured characteristic curve to a previously determined characteristic curve. FIG. 1 shows the evaluation unit 10 as a separate component. Alternatively, however, it is also possible for the evaluation unit 10 to be an integral part of the measurement unit 6 or of the control unit 9. Alternatively, as shown in FIG. 2, it may also be arranged outside of the inverter. The communications unit 12 is designed to communicate the detected values of current $I_{Str}$ and voltage $U_{Str}$, as well as further characteristic curve data, to an external unit, for example, a portal reachable via the Internet. In this way, a current state of the PV system 1 can also be queried by other electronic devices capable of accessing the Internet. The communications unit 12 is also configured to receive a trigger signal from an external communications device, e.g., a smartphone, and to initiate, based upon the trigger signal, an impress of the current signature onto the current $I_{Str}$ through the PV string 3.

Impressing the current signature onto the current $I_{Str}$ in the PV string 3 can be achieved in one embodiment by means of an inductively or capacitively operating coupling unit (not shown in FIG. 1) present in any case in the inverter 11. Such coupling units are used, for example, to generate a "keep-alive signal" in order to leave the PV generator 4, in normal feed mode of the PV system 1, in an activated operating mode, in which power is drawn from the PV generator, and, in the event of danger (discontinuation of the "keep-alive signal"), to transfer it, by opening a separating unit close to the generator or closing a short-circuit unit close to the generator, into a safe state, in which a power draw from the PV generator is suppressed. Alternatively, however, it is also possible for the DC/AC converter 8 to operate the PV string 3 at an operating point close to no-load during a first time period Δt1, and thus to produce a current $I_{Str}$ below a limit value $I_{LV}$ in the PV string 3.

In FIG. 2, a second embodiment of the PV system 1 according to the disclosure is shown. In many aspects, it is similar to the first embodiment already shown in FIG. 1. Therefore, only the differences from the first embodiment are explained below, while, with respect to the same features, reference is made to the description of FIG. 1.

The PV system 1 illustrated in FIG. 2 includes a PV generator 4 having several (here: two) PV strings 3. Each of the PV strings 3 is connected to a separate input 11.1 of a two-stage inverter 11. In their structure, the PV strings 3 are similar to the PV string 3 of the PV system 1 shown in FIG. 1. Each of the PV modules 2 is integrated into the series connection of the PV modules 2 via a DC/DC converter 5. However, the numbers of PV modules 2 as well as of the DC/DC converters 5 of the two PV strings 3 of the PV generator 4 may differ from one another. In FIG. 2, the inverter 11 is formed as a so-called multi-string inverter, in which each of the inputs 11.1 is connected to a common DC intermediate circuit 7 via a DC/DC converter 13. The common DC intermediate circuit 7 is connected to an input of the DC/AC converter 8. Each of the DC/DC converters 13 is configured to vary a voltage $U_{Str}$ or a current $I_{Str}$ of the PV string 3 connected thereto in order to determine a characteristic curve. In addition, each of the DC/DC converters 13 is configured to impress a current signature onto the PV string 3 assigned thereto. This can take place, for example, by the DC/DC converter 13 operating the PV string at its no-load voltage for a first time period Δt1. For this purpose, a control unit 9 of the inverter 11 is connected in terms of control technology to both the DC/AC converter 8 and the two DC/DC converters 13. In contrast, each of the DC/DC converters 5 of the PV string 3 operating as power optimizers is configured to detect the current signature in the current flowing via its output 5.2 and to assume the second operating mode M2 in response to the detected current signature. In order to detect current values $I_{Str}$ and voltage values $U_{Str}$, each of the inputs 11.1 is connected to a measurement unit 6. For communicating the detected current values $I_{Str}$ and voltage values $U_{Str}$, the measurement units 6 are connected to a communications unit 12, which transmits the values to an external evaluation unit 10. The external evaluation unit 10 can, for example, be an Internet-based portal, which aggregates data of several PV systems in order to compare them to one another for quality statements. Here as well, the inverter 11 is connected, via an output 11.2, to a power supply network 15.

Figure 3:
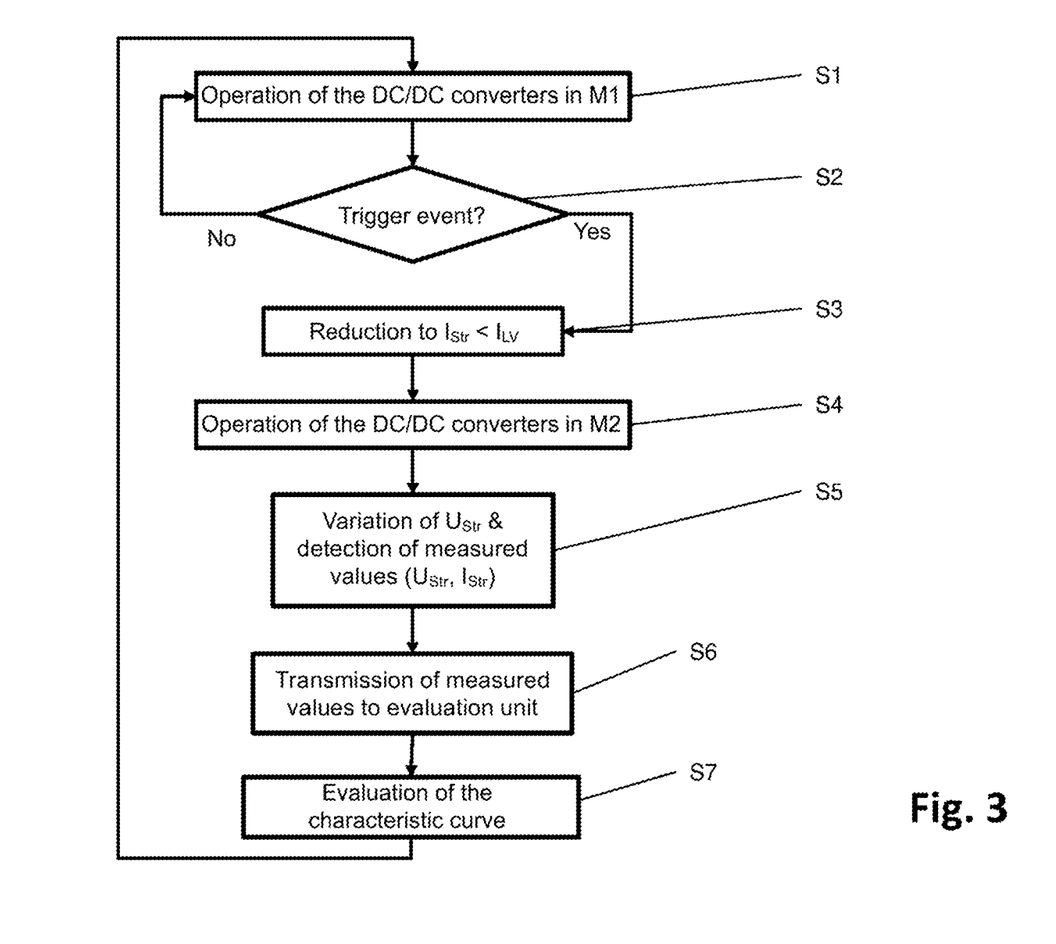
FIG. 3 a flowchart of a method according to the disclosure.

FIG. 3 shows a flowchart of a method according to the disclosure as can be carried out, for example, with the PV system 1 of FIG. 1 or the PV system 1 of FIG. 2.

In a first act S1, the PV system 1 is in normal feed mode, and the DC/DC converters 5 within the PV string 3 operate in the first operating mode M1. The PV modules 2 respectively assigned to the DC/DC converters 5 are here operated at a maximum power point (MPP). In act S2, there is a query as to whether the inverter 11 has received a trigger event. Such a trigger event can, for example, be transmitted via an external communications device, e.g., a smartphone, to the inverter 11 via its communications unit 12. Alternatively, however, the trigger event may also be generated in a time-controlled manner, e.g., by means of an electronic clock implemented within the inverter 11. If there is no trigger event, the method jumps back to act S1. On the other hand, if a trigger event is present, the method jumps to act S3, in which a current signature is produced by the inverter 11 in the PV string 3. In the illustrated case, the PV string 3 is operated during a first time period $Δt_1$ at an operating point close to no-load. For the first time period $Δt_1$, the inverter 11 thus generates a current $I_{Str}$ through the PV string 3 below a limit value $I_{LV}$, with $I_{Str} < I_{LV}$. The DC/DC converters 5 in the PV string 3 detect the current signature in the current $I_{Str}$ flowing via their output 5.2. In response, they assume, at act S4, the second operating mode M2 with a constant conversion ratio of output voltage $U_{Out}$ to input voltage $U_{In}$, and maintain it for a second time period $Δt_2$. At act S5, the inverter 11 varies the voltage $U_{Str}$ or the current $I_{Str}$ of the PV string 3 during the second time period $Δt_2$, either via the DC/AC converter 8 (in case of the PV system in FIG. 1) or via one of the DC/DC converters 13 (in case of the PV system in FIG. 2). During the variation, values assigned to one another of current $I_{Str}$ and voltage $U_{Str}$ of the PV string are detected by the measurement unit 6. After the second time period $\Delta t_2$ has elapsed, the detection of the values of current $I_{Str}$ and voltage $U_{Str}$ is completed. In addition, in act S6, the detected values of current $I_{Str}$ and voltage $U_{Str}$ are transmitted to the evaluation unit 10, which evaluates therefrom, at act S7, the characteristic curve of the PV string 3 and, possibly, further characteristic values characterizing the PV string 3. Optionally, the characteristic values, as well as the detected values of current $I_{Str}$ and voltage $U_{Str}$, can be transmitted to a further external evaluation unit, for example an Internet-based portal. The method subsequently jumps back to act S1, at which time the DC/DC converters 5 are operated again in the first operating mode M1.

The invention claimed is:

1. A method for determining a characteristic curve for a photovoltaic (PV) string of a PV system having an inverter, which on an input side thereof is connected to the PV string and on an output side thereof is connected to a power supply network,
   wherein the PV string comprises a series connection of multiple PV modules, in which at least one of the PV modules is integrated into the series connection of the PV modules via a DC/DC converter,
   wherein the DC/DC converter of the at least one of the PV modules is suitable and configured to operate the PV module assigned thereto in a first operating mode M1 by temporal variation of a conversion ratio of output voltage ($U_{Out}$) to input voltage ($U_{In}$) at a maximum power point, and, in a second operating mode M2, to operate the PV module assigned thereto with a temporally constant conversion ratio of output voltage ($U_{Out}$) to input voltage ($U_{In}$),
   comprising:
       operating the DC/DC converter of the at least one of the PV modules in the second operating mode M2 in response to a current signature for a current ($I_{Str}$) through the PV string, which current signature is produced by the inverter,
       determining a characteristic curve by varying the current Ist or a voltage $U_{Str}$ of the PV string by the inverter and detecting values assigned to one another for current $I_{Str}$ and voltage $U_{Str}$ of the PV string in the second operating mode M2 of the DC/DC converter.

2. The method according to claim 1, wherein the detection of the values assigned to one another for current ($I_{Str}$) and voltage ($U_{Str}$) for determining the characteristic curve is carried out by a measurement unit arranged within the inverter.

3. The method according to claim 1, wherein the current signature comprises the PV string being operated with a current $I_{Str}$ through the PV string below a limit value $I_{LV}$ so that $I_{Str}<I_{LV}$ for a first time period $\Delta t_1$.

4. The method according to claim 3, wherein the DC/DC converter is operated in the second operating mode M2 for a second time period $\Delta t_2$.

5. The method according to claim 4, wherein, after the second time period $\Delta t_2$ has elapsed, operating the DC/DC converter in the first operating mode M1 or temporarily in a third operating mode M3, wherein in the third operating mode M3 a power draw of the PV module assigned to the DC/DC converter is suppressed.

6. The method according to claim 1, wherein the current signature produced by the inverter is triggered in a time-controlled or event-controlled manner.

7. The method according to claim 1, wherein all of the multiple PV modules of the PV string are integrated into the series connection of the PV modules via a respective DC/DC converter, and wherein, in the second operating mode M2, all DC/DC converters within the PV string are operated with the same temporally constant conversion ratio of output voltage ($U_{Out}$) to input voltage ($U_{In}$).

8. The method according to claim 7, wherein all DC/DC converters within the PV string are operated with the temporally constant conversion ratio of the value "1" in the second operating mode M2.

9. The method according to claim 1, wherein all of the multiple PV modules of the PV string are integrated into the series connection of the PV modules via a respective DC/DC converter, and wherein the conversion ratio of output voltage ($U_{Out}$) to input voltage ($U_{In}$) in the second operating mode M2 for all DC/DC converters within the PV string is selected such that the voltage $U_{Str}$ of the PV string is within a permitted range for an input voltage of the inverter.

10. The method according to claim, 1 wherein the current signature contains an individual identifier of individual DC/DC converters of the PV string, wherein only the individual DC/DC converters are set to operate in the second operating mode M2, and the remaining DC/DC converters of the PV string are set to operate in a third operating mode M3 that suppresses a power draw of the assigned PV module, or wherein only the individual DC/DC converters are set to operate in the third operating mode M3 that suppresses a power draw of the assigned PV module, and the remaining DC/DC converters of the PV string are set to operate in the second operating mode M2.

11. A DC/DC converter having an input for connecting a PV module and an output for connecting the DC/DC converter to further PV modules of the series string of PV modules, wherein the DC/DC converter is configured to:
   in a first operating mode M1, operate the PV module assigned thereto at a maximum power point by a temporal variation of a conversion ratio of output voltage ($U_{Out}$) to input voltage ($U_{In}$) of the DC/DC converter, and
   in a second operating mode M2, operate the PV module assigned thereto at a temporally constant conversion ratio of output voltage ($U_{Out}$) to input voltage ($U_{In}$) of the DC/DC converter, and
   assume the second operating mode M2 in response to detection of a current signature contained in a current Ist flowing via the output of the DC/DC converter.

12. The DC/DC converter according to claim 11, wherein the DC/DC converter is configured as a buck converter.

13. A photovoltaic (PV) system comprising:
   a PV generator having at least one PV string comprising a series connection of multiple PV modules,
   an inverter connected on an input side thereof to the PV string and on an output side thereof to a power supply network, wherein the inverter is configured to:
       produce a current signature in the PV string in response to a trigger signal, and subsequently vary, in particular within a second time period $\Delta t_2$, a voltage $U_{Str}$ of the PV string in order to determine a characteristic curve of the PV string,
   a measurement unit configured to detect values assigned to one another for current $I_{Str}$ and voltage $U_{Str}$ of the PV string,
   wherein in the at least one PV string, at least one of the PV modules is integrated into the series connection of the PV modules via a DC/DC converter, wherein the DC/DC converter is configured to:

in a first operating mode M1, operate the PV module assigned thereto at a maximum power point by a temporal variation of a conversion ratio of output voltage ($U_{Out}$) to input voltage ($U_{In}$) of the DC/DC converter, and in a second operating mode M2, operate the PV module assigned thereto at a temporally constant conversion ratio of output voltage ($U_{Out}$) to input voltage ($U_{In}$) of the DC/DC converter, and assume the second operating mode M2 in response to detection of the current signature contained in a current $I_{Str}$ flowing via the output of the DC/DC converter.

14. The PV system according to claim 13, wherein all of the multiple PV modules of the PV string or all PV modules of the PV generator are connected to the series connection of the PV modules via a DC/DC converter.

15. The PV system according to claim 13, wherein the measurement unit is arranged within the inverter.

16. The PV system according to claim 13, wherein the measurement unit comprises or is connected to a communications unit for communicating the current values 1st and voltage values $U_{Str}$.

* * * * *